T. J. SPROUL.
GRIPPER.
APPLICATION FILED MAY 7, 1909.
963,087.
Patented July 5, 1910.
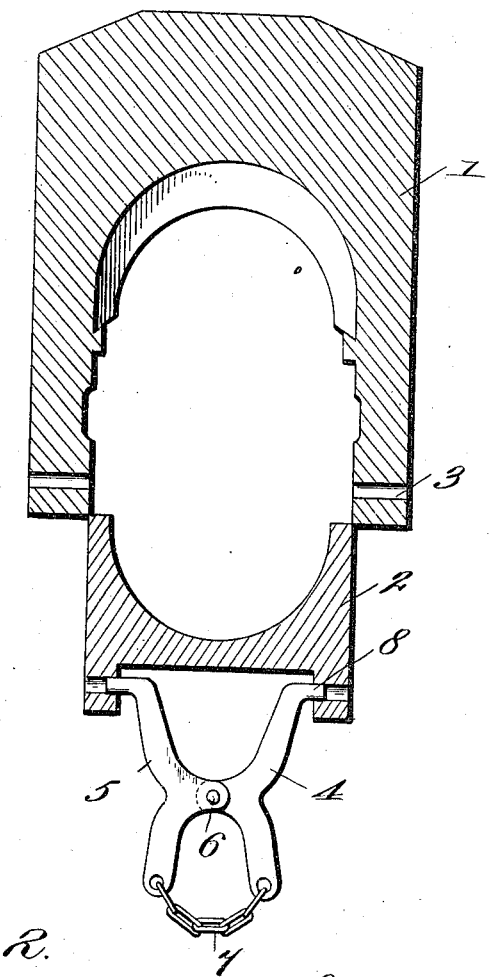
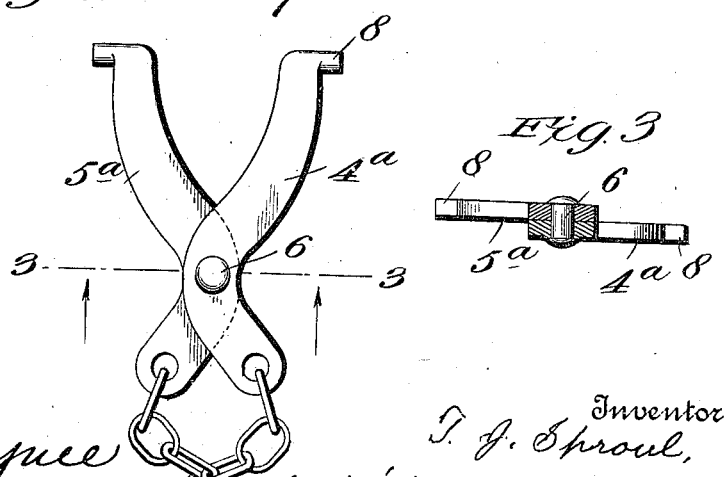
Witnesses
Geo. A. Bynee
Jas. E. Dodge
Inventor
T. J. Sproul,
By Wilkinson, Fisher & Witherspoon
Attorneys

UNITED STATES PATENT OFFICE.

THOMAS J. SPROUL, OF CHEYENNE, WYOMING.

GRIPPER.

963,087.  Specification of Letters Patent.  Patented July 5, 1910.

Application filed May 7, 1909. Serial No. 494,670.

*To all whom it may concern:*

Be it known that I, THOMAS J. SPROUL, a citizen of the United States, residing at Cheyenne, in the county of Laramie and State of Wyoming, have invented certain new and useful Improvements in Grippers; and I do hereby declare the following to be a full, clear, and exact description of the invention, such as will enable others skilled in the art to which it appertains to make and use the same.

My invention relates to improvements in grippers, and the object of my invention is to provide a simple and easily workable device of this class by means of which the lower parts of oil boxes in locomotives may be easily removed, while the locomotive is in the round house, and reinserted.

With this object in view my invention consists in the construction and combination of parts as hereinafter described and claimed.

In the accompanying drawing:—Figure 1 represents in cross section a locomotive bearing with my invention attached thereto. Fig. 2 is a perspective view of the preferred form of my invention, and Fig. 3 is a cross section thereof on the line 3—3 of Fig. 2.

1 represents the upper part of the bearing having a removable portion 2 adapted to be pulled out for the purpose of oiling and cleaning. Both of these parts are perforated, as shown at 3, and when the locomotive is running a bolt passes through these perforations extending the whole width of the part 1, and holding the parts in position.

My device consists of two bent arms 4 and 5 pivoted together, as shown at 6, the lower ends being loosely connected by the chain 7, and the upper ends of the arms being bent in a horizontal position and rounded, as shown at 8, so that these rounded ends may easily enter the apertures in the part 2.

In Fig. 2 my invention is shown in its preferred form, which consists of two arms $4^a$ and $5^a$ having horizontal upper rounded ends 8, and their lower ends connected by the chain 7, these arms being connected by a pivot 6. As shown in Fig. 2, the arms $4^a$ and $5^a$ are bent toward each other so as to overlap for a considerable distance above the pivot 6, and are then bent away from each other overlapping below the pivot 6, the shape being such that the bar or rod placed between the lower ends and lifted will tend to force the upper rounded ends 8 toward each other.

The operation is as follows:—When it is desired to remove the lower part of a bearing, the securing bolt is first removed and the arms 8 inserted into the holes at the lower part of the movable portion, as shown in Fig. 2. An iron bar or other suitable lever is slipped between the lower ends of the arms and the chain 7, its end resting against any suitable fulcrum which may be a part of the locomotive. A pressure on the bar will then pull the part 2 out of its socket, as shown in Fig. 1, and it should be noted that the downward pressure on the chain tends to throw the points 8 away from each other, thus always keeping them firmly in engagement with the part 2. When it is desired to return the part 2 to its original position, the iron bar is slipped above the chain 7 between the lower ends of the arms and lifted, forcing the part 2 back into its original position, when the gripper is removed and the bolt reinserted.

I claim:—

A gripper for removing or reinserting parts, consisting of two arms pivoted together, each of said arms being bent away from the central plane of the device on each side thereof, and terminating in alined working projections, and a flexible connection between the other ends of said arms for engagement with an operating lever, substantially as described.

In testimony whereof, I affix my signature, in presence of two witnesses.

THOMAS J. SPROUL.

Witnesses:
 A. THAPMANS,
 THOS. HEANRY.